(12) United States Patent
Recker et al.

(10) Patent No.: US 11,752,511 B2
(45) Date of Patent: Sep. 12, 2023

(54) MIST SPRAYER APPARATUS

(71) Applicant: OMS Investments, Inc., Los Angeles, CA (US)

(72) Inventors: Derek Jordan Recker, Columbus, OH (US); Matthew David Merritt, Oneida, NY (US); John Hubert Vaughan, IV, Waterville, NY (US); Mark Albert Roscup, Utica, NY (US); Jeffrey David Nicolia, Erie, PA (US)

( * ) Notice: Subject to any disclaimer, the term of this patent is extended or adjusted under 35 U.S.C. 154(b) by 321 days.

(21) Appl. No.: 16/902,922

(22) Filed: Jun. 16, 2020

(65) Prior Publication Data

US 2020/0391236 A1   Dec. 17, 2020

Related U.S. Application Data

(60) Provisional application No. 62/979,760, filed on Feb. 21, 2020, provisional application No. 62/862,339, filed on Jun. 17, 2019.

(51) Int. Cl.
| | |
|---|---|
| *B05B 7/24* | (2006.01) |
| *B05B 7/00* | (2006.01) |
| *B05B 7/04* | (2006.01) |
| *A01M 7/00* | (2006.01) |

(52) U.S. Cl.
CPC .......... *B05B 7/2464* (2013.01); *B05B 7/0075* (2013.01); *B05B 7/0483* (2013.01); *A01M 7/0017* (2013.01)

(58) Field of Classification Search
CPC ... B05B 7/2464; B05B 7/0075; B05B 7/0483; A01M 7/0017
USPC ............................ 239/77, 289, 426, 433, 434
See application file for complete search history.

(56) References Cited

U.S. PATENT DOCUMENTS

| | | | |
|---|---|---|---|
| 3,498,028 A | | 3/1970 | Trouw |
| 3,963,178 A | * | 6/1976 | Collins ................. B05B 7/0458 239/405 |
| 4,512,515 A | | 4/1985 | Tenney |
| 5,044,559 A | | 9/1991 | Russell et al. |
| 6,216,961 B1 | * | 4/2001 | Utter ..................... B05B 7/0075 239/289 |

(Continued)

FOREIGN PATENT DOCUMENTS

| | | |
|---|---|---|
| DE | 10152431 A1 | 5/2003 |
| EP | 2181773 A1 | 5/2010 |

(Continued)

OTHER PUBLICATIONS

International Search Report and Written Opinion of the International Searching Authority for International Patent App. No. PCT/US20/37912 dated Oct. 9, 2020; 11 pages.

*Primary Examiner* — Christopher S Kim
(74) *Attorney, Agent, or Firm* — Frost Brown Todd LLP

(57) ABSTRACT

A mister apparatus includes a portable mister body having an air inlet and an air outlet, a fan configured to draw air in through the air inlet and force the air out the air outlet, a reservoir configured to contain a liquid, the reservoir having a reservoir outlet, a liquid outlet, the liquid outlet being disposed adjacent to or downstream of the air outlet, and a pump in fluid communication with the reservoir. The pump is operable to move the liquid from the reservoir and out of the liquid outlet such that the liquid exiting the liquid outlet enters into the air exiting the air outlet to form a mist.

20 Claims, 13 Drawing Sheets

(56) References Cited

U.S. PATENT DOCUMENTS

| | | |
|---|---|---|
| 6,837,447 B1 | 1/2005 | Clark |
| 7,032,830 B2 | 4/2006 | Ekelöf |
| 7,065,944 B1 | 6/2006 | Steele |
| 7,766,256 B2 | 8/2010 | Loaces |
| 7,866,571 B2 | 1/2011 | Müller et al. |
| 7,946,511 B2 | 5/2011 | Ballu |
| 8,224,481 B2 | 7/2012 | Bylsma et al. |
| 8,327,845 B2 | 12/2012 | Weinstein et al. |
| D714,898 S | 10/2014 | Franks et al. |
| 9,414,580 B2 | 8/2016 | Franks et al. |
| 9,788,536 B1 | 10/2017 | Dixon |
| 9,795,976 B2 | 10/2017 | Eames et al. |
| 9,878,337 B1 | 1/2018 | Hong |
| 10,028,497 B1 | 7/2018 | Brookins |
| 10,588,310 B2 | 3/2020 | Franks et al. |
| 11,340,045 B2 * | 5/2022 | Boyles .................. A01M 13/00 |
| 2004/0046052 A1 | 3/2004 | Chang |
| 2004/0135004 A1 | 7/2004 | Fex |
| 2004/0255564 A1 | 12/2004 | Loaces |
| 2005/0150976 A1 | 7/2005 | Stengel |
| 2006/0123758 A1 | 6/2006 | Loaces |
| 2007/0119972 A1 | 5/2007 | Fex |
| 2008/0035758 A1 | 2/2008 | Muller et al. |
| 2008/0111257 A1 | 5/2008 | Huang |
| 2009/0008473 A1 | 1/2009 | Yun |
| 2009/0014558 A1 | 1/2009 | Phillips et al. |
| 2009/0025794 A1 | 1/2009 | Dorendorf et al. |
| 2011/0113586 A1 | 5/2011 | Loaces |
| 2011/0197389 A1 | 8/2011 | Ota et al. |
| 2012/0324911 A1 | 12/2012 | Shedd |
| 2014/0312142 A1 | 10/2014 | Lovett |
| 2015/0082689 A1 | 3/2015 | Bertrand et al. |
| 2015/0147473 A1 | 5/2015 | Tse |
| 2016/0262372 A1 | 9/2016 | Kunz et al. |
| 2016/0279652 A1 | 9/2016 | States, III et al. |
| 2017/0209840 A1 | 7/2017 | Swallow et al. |
| 2017/0209893 A1 | 7/2017 | Swallow et al. |
| 2017/0252766 A1 | 9/2017 | Post et al. |
| 2018/0207654 A1 | 7/2018 | Phua |
| 2018/0352798 A1 | 12/2018 | Clarke et al. |
| 2018/0352800 A1 | 12/2018 | Franks et al. |
| 2019/0154406 A1 * | 5/2019 | Boyles .................. A01M 13/00 |
| 2020/0139387 A1 | 5/2020 | Song |
| 2020/0154693 A1 | 5/2020 | Franks et al. |

FOREIGN PATENT DOCUMENTS

| | | |
|---|---|---|
| EP | 3485730 A1 | 5/2019 |
| GB | 713406 A | 8/1954 |
| KR | 101153188 B1 | 5/2012 |
| KR | 101185064 B1 | 9/2012 |
| KR | 101187634 B1 | 9/2012 |
| WO | 0069569 A1 | 11/2000 |
| WO | 0153741 A1 | 7/2001 |
| WO | 2007039776 A1 | 4/2007 |
| WO | 2015198163 A1 | 12/2015 |

* cited by examiner

MIST SPRAYER APPARATUS

CROSS-REFERENCE TO RELATED APPLICATIONS

This application claims the priority benefit of U.S. Provisional Patent App. No. 62/979,760, filed Feb. 21, 2020, and U.S. Provisional Patent App. No. 62/862,339, filed Jun. 17, 2019, each of which is incorporated herein by reference in its entirety.

TECHNICAL FIELD

Embodiments of the technology relate, in general, to spraying apparatus technology.

BACKGROUND

In a mist spraying device, a liquid, such as an insecticide, may be converted into a fine droplet size generally ranging from 50 to 200 microns. Similarly, fog spraying devices produce a smaller droplet size of less than 50 microns. When using an insecticide, smaller particles are more easily absorbed by insects providing better efficacy. Fog generating devices require heating of the liquid, creating a potential burn hazard from the liquid or device. The fine particle size of fog also creates a potential risk of inhalation and wind drift when used outdoors. A mist sized particle can be generated without heat and with reduced risk of inhalation and wind drift. A cold fogger may operate by passing pressurized air passes past a moving liquid jet to create atomized particles. There exists a need for improved misters.

SUMMARY

In an embodiment, a mister apparatus includes a portable mister body having an air inlet and an air outlet, a fan configured to draw air in through the air inlet and force the air out the air outlet, a reservoir configured to contain a liquid, the reservoir having a reservoir outlet, a liquid outlet, the liquid outlet being disposed adjacent to or downstream of the air outlet, and a pump in fluid communication with the reservoir. The pump is operable to move the liquid from the reservoir and out of the liquid outlet such that the liquid exiting the liquid outlet enters into the air exiting the air outlet to form a mist.

In another embodiment, a mister apparatus includes a portable mister body having an air inlet and an air outlet, a fan configured to draw air in through the air inlet and force the air out the air outlet, a motor operably coupled to the fan, a reservoir configured to contain a liquid, the reservoir having a reservoir outlet. The mister apparatus also includes a liquid outlet, the liquid outlet being disposed adjacent to or downstream of the air outlet, and a positive displacement pump in fluid communication with the reservoir. The positive displacement pump is operable to move the liquid from the reservoir and out of the liquid outlet such that the liquid exiting the liquid outlet enters into the air exiting the air outlet to form a mist. The liquid outlet is substantially perpendicular to the air outlet, the liquid outlet constructed to dispense the liquid at an orientation substantially perpendicular to the air exiting the air outlet.

BRIEF DESCRIPTION OF THE DRAWINGS

The present disclosure will be more readily understood from a detailed description of some example embodiments taken in conjunction with the following figures:

FIG. 5 is an exploded view of the mister apparatus of FIG. 1;

Figure 9:
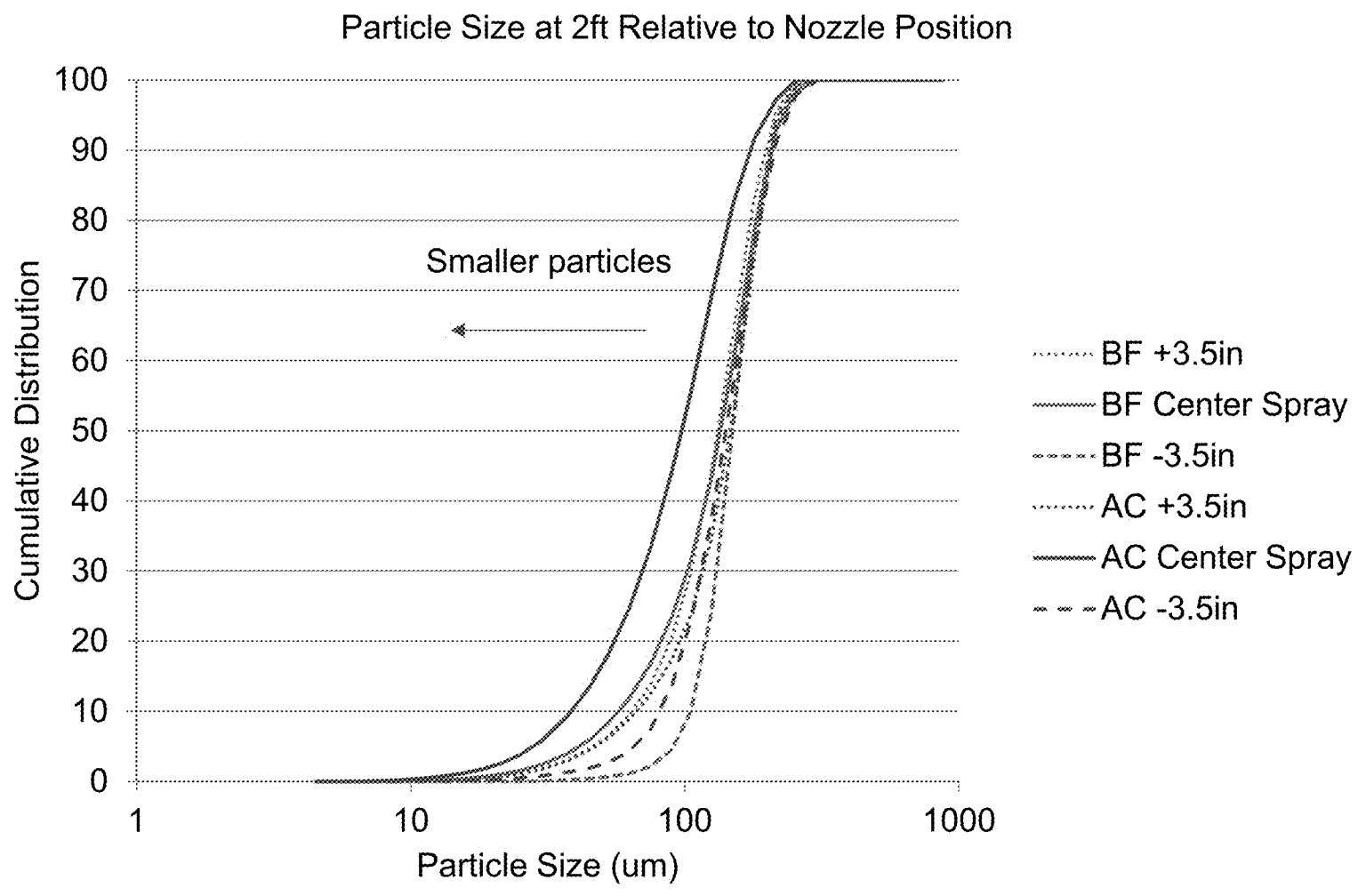

FIG. 9 is a chart showing the distribution of the particle size of the mist sprayed two feet away from the nozzle of a mister apparatus according to one or more embodiments;

DETAILED DESCRIPTION

Various non-limiting embodiments of the present disclosure will now be described to provide an overall understanding of the principles of the structure, function, and use of the apparatuses, systems, methods, and processes disclosed herein. One or more examples of these non-limiting embodiments are illustrated in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment," or "in an embodiment" in places throughout the specification are not necessarily all referring to the same embodiment. Furthermore, the particular features, structures or characteristics may be combined in any suitable manner in one or more embodiments.

The examples discussed herein are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. Any failure to specifically describe a combination or sub-combination of components should not be understood as an indication that any combination or sub-combination is not possible. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Described herein are example embodiments of a mister apparatus. In some embodiments, a mister apparatus is portable. The term "portable," as used herein, means to be able to be easily carried or moved, especially because being of a lighter and smaller version than usual and to not be limited as to where it can be carried or moved. For example, a device requiring a hard-wired connection to an A/C power source (e.g., an A/C power chord plugged into an A/C outlet) would not be portable.

Figure 1:
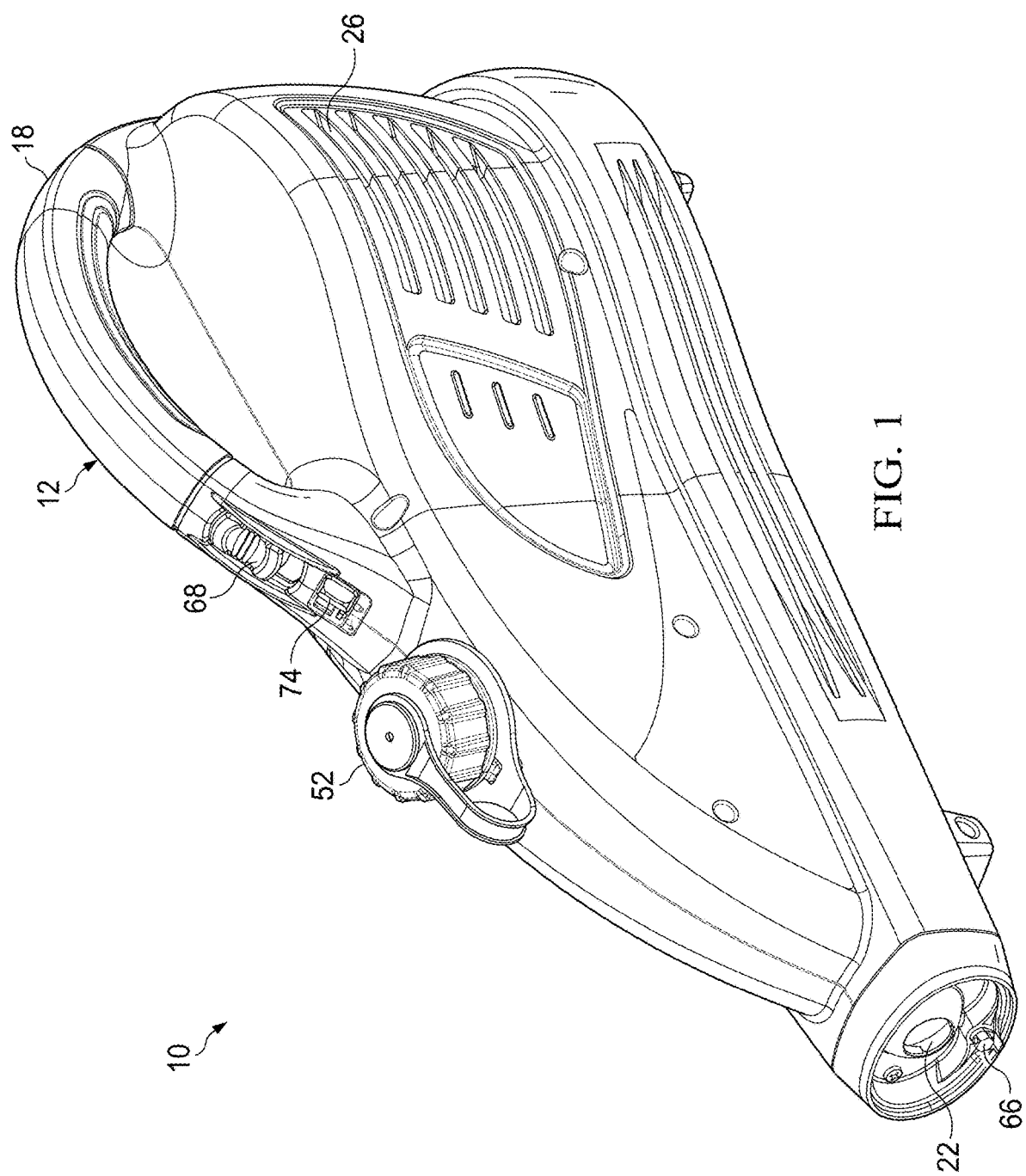
FIG. 1 is a top isometric view of a mister apparatus according to one or more embodiments.
Figure 2:
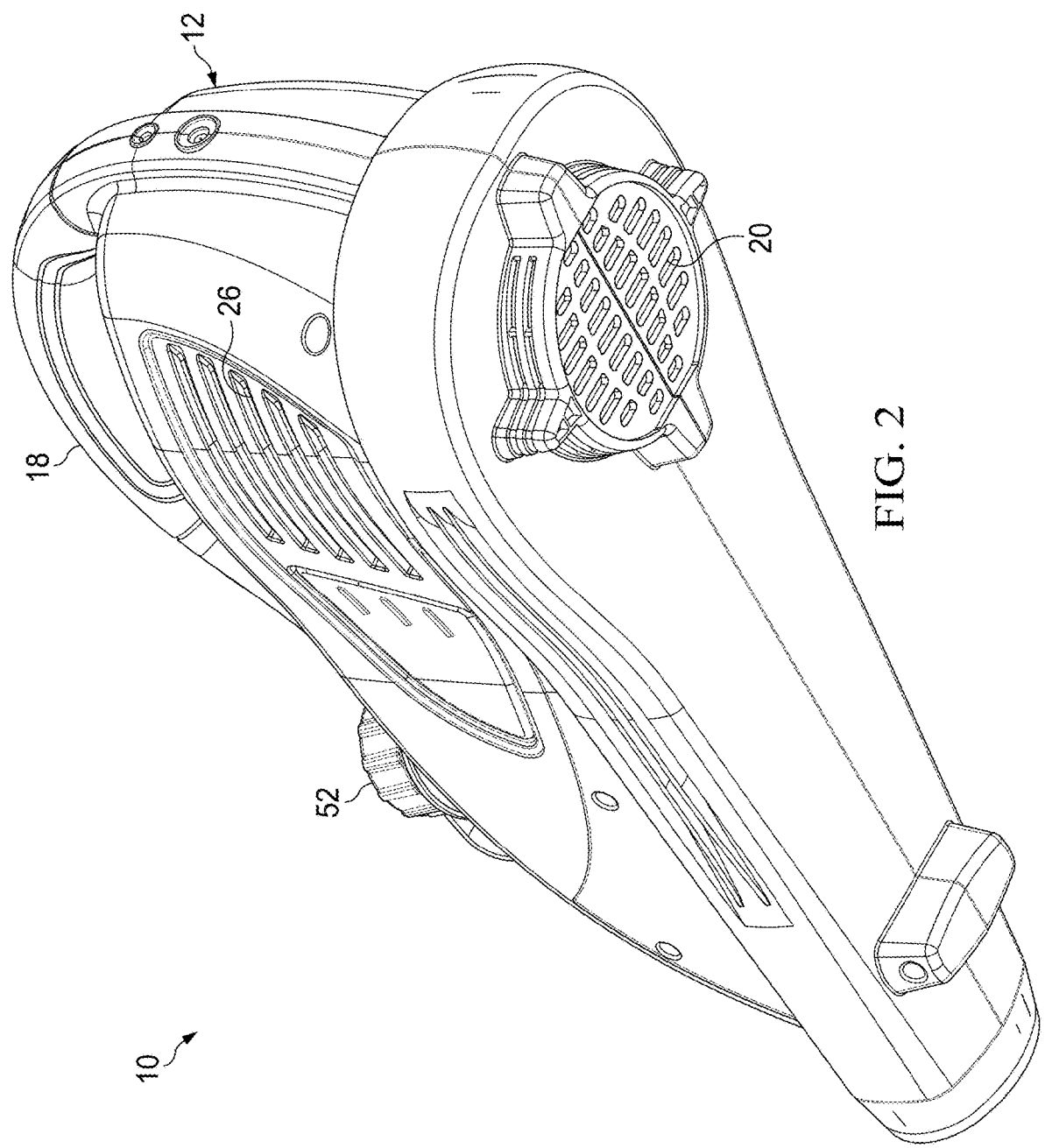
FIG. 2 is a bottom isometric view of the mister apparatus of FIG. 1.
Figure 3:
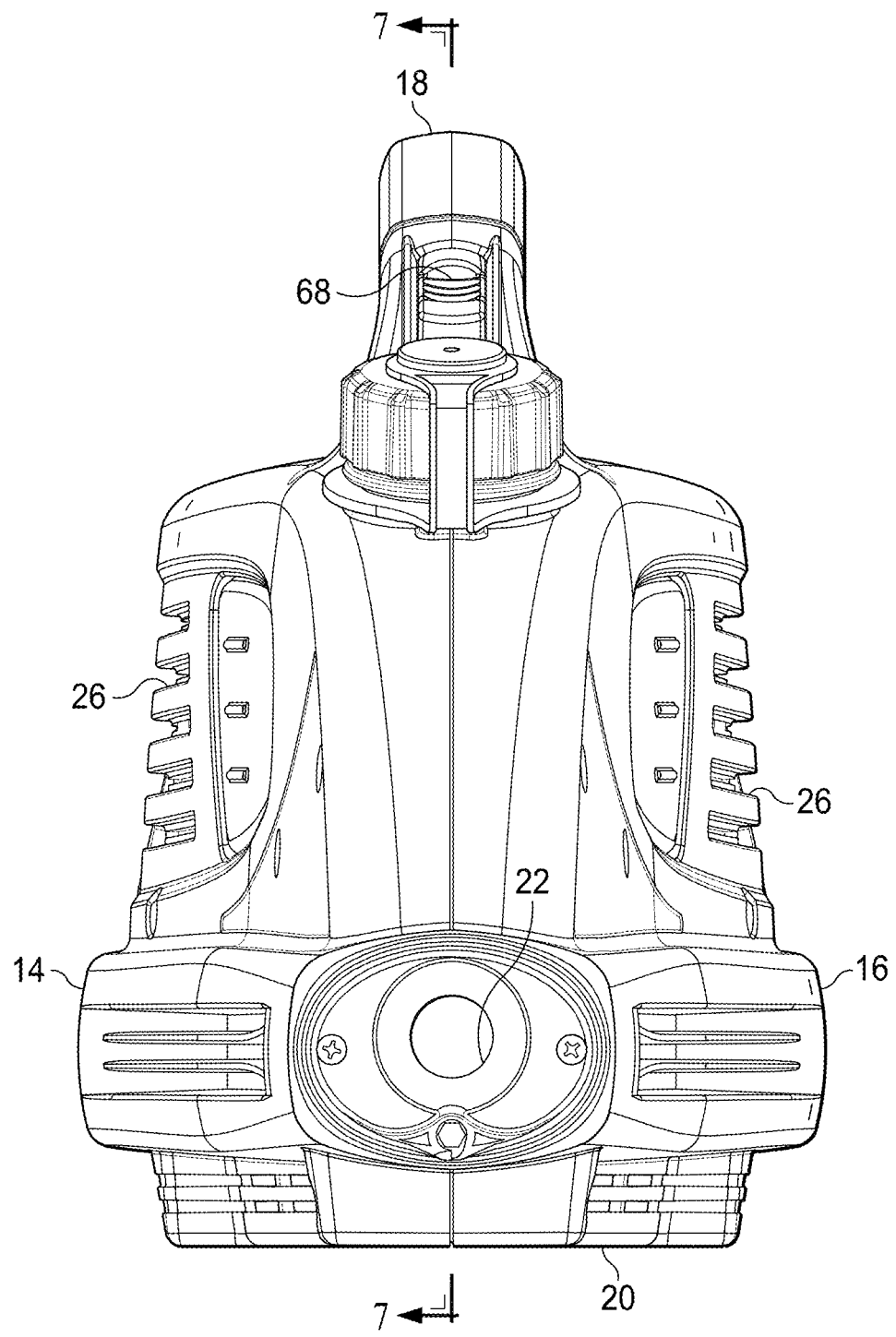
FIG. 3 is a front view of the mister apparatus of FIG. 1.
Figure 4:
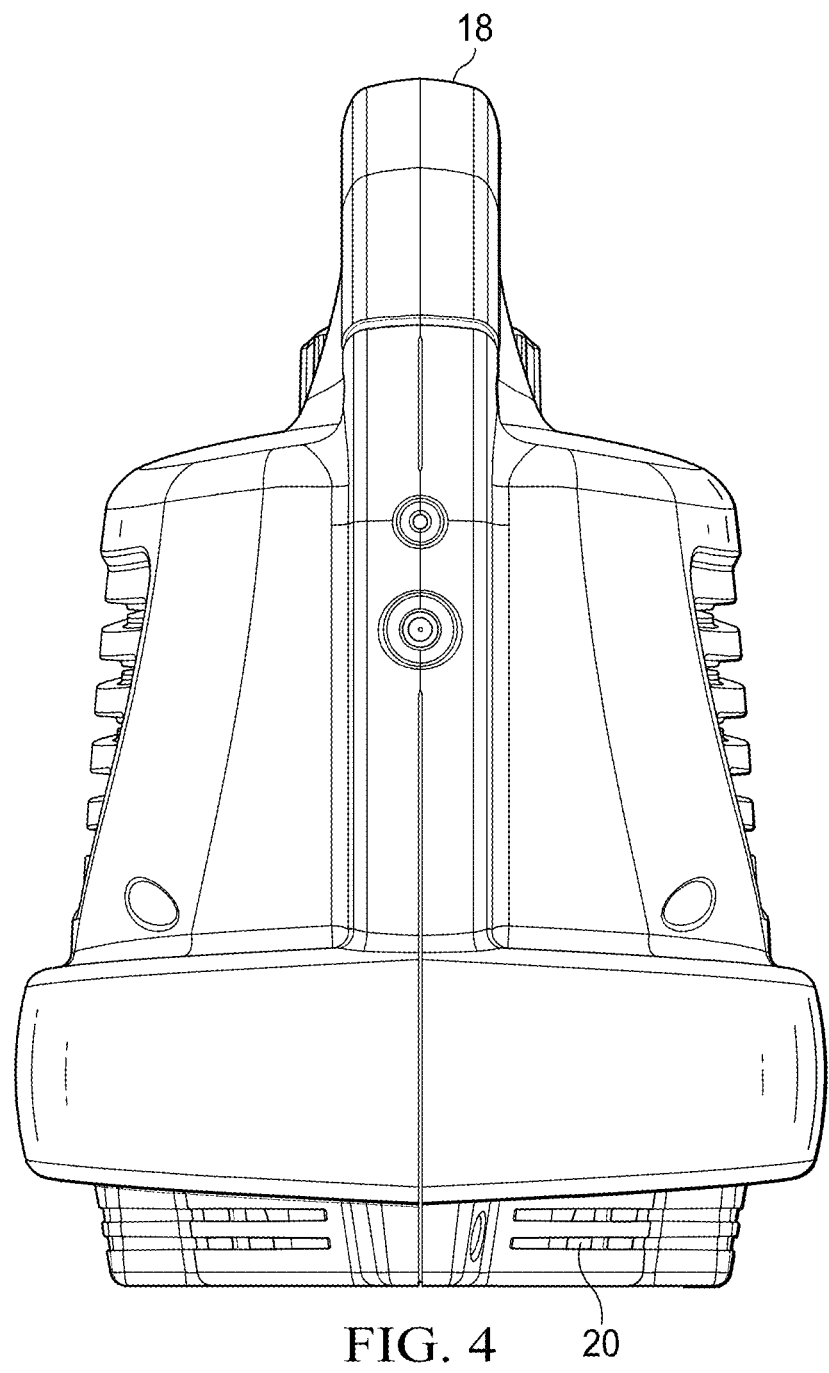
FIG. 4 is a rear view of the mister apparatus of FIG. 1.

Referring to FIGS. 1-4, a representative mister apparatus 10 is shown. For example, mister apparatus 10 includes a mister body 12. In some embodiments, mister body 12 may include a first housing 14 and a second housing 16 that may be connected together to form mister body 12. Mister apparatus 10 may also include a handle 18. In some embodiments, mister body 12 may include the handle as shown, for example, in FIGS. 1 and 3. Handle 18 may be constructed to take any form. In some embodiments, handle 18 is constructed to have an ergonomic or curved shape to fit or more comfortably fit an operator's hand. Mister body 12 may also include an inlet and an outlet positioned anywhere along the body. In some embodiments, mister body 12 may include an inlet 20 on a front or forward side and an outlet 22 on a bottom side of mister body 12 as shown in FIGS. 1-3. In addition, mister body 12 may also include an aperture 24. Aperture 24 may be positioned anywhere along the mister body as well. In some embodiments, aperture 24 is positioned on an upper side of the mister body as shown, for example, in FIG. 3. Aperture 24 allows a portion of a tank to extend therethrough, as discussed further below. In some embodiments, first housing 14 and second housing 16 may be constructed such that when the two housings are brought together and/or connected to each other they form handle 18, inlet 20, outlet 22, and aperture 24 (see, for example, FIG. 4). The first housing and/or second housing 16 may also include vents 26. The vents 26 may allow air to flow into the mister body 12 to cool internal components (e.g., a motor).

Mister apparatus 10 may include a motor 28 disposed outside of, partially within, or completely within mister body 12. As shown in the embodiment in FIGS. 1-4, motor 28 is disposed between one or more batteries 30 and fan 32, which defines fan inlet 34 and fan outlet 36. Motor 28 is electrically connected to one or more batteries 30 and is mechanically connected to fan 32 such that is draws power from one or more batteries 30 to drive fan 32. Mister apparatus may include a first air pathway 38 (e.g., air flow A) between inlet 20 and fan inlet 34 and a second air pathway 40 (e.g., air flow B) from fan outlet 36 to an air nozzle.

Mister apparatus 10 may include an air nozzle 42 disposed within second air pathway 40, upstream of outlet 22. In some embodiments, air nozzle 42 may be disposed in and/or at outlet 22. In some embodiments, as shown, for example, in FIGS. 3 and 4, air nozzle 42 may include vanes 44 disposed within air nozzle 42. Vanes 44 may be constructed to agitate the air flow at and/or within air pathway 40 before the air flow exits outlet 22. The number and shape of the vanes may vary. In some embodiments, vanes 44 are constructed to include a curved shape and/or angled relative to the air flow within second air pathway 40, for example, in a helical design as shown in the figures. The helical design may create a swirling of the air flow within second air pathway 40 as it exits the air nozzle 42 and then passes through and exits outlet 22. In other embodiments, the air nozzle 42 may include no vanes. The air nozzle 42 may be removable from mister body 12. The size and shape of air nozzle 42 may vary. In some embodiments, multiple air nozzles 42 having different sizes may be configured to attach to the same mister body 12.

Mister apparatus 10 may include a tank 46 disposed outside of, partially within, or completely within mister body 12. As shown in FIGS. 1-3, a reservoir, such as tank 46, is disposed within mister body 12. In some embodiments, tank 46 may be positioned adjacent and/or connected to mister body 12 (e.g., to be carried separately from the mister body 12, such as in a backpack). Tank 46 may include a tank inlet 48 and a tank outlet 50 to permit the filling of a liquid into tank 46 and the dispensing of such liquid from the tank 46. In an embodiment, a single opening may act as the inlet and outlet of the tank 46. In some embodiments, tank 46 is constructed to contain a non-pressurized liquid. Illustrative liquids that may be contained within tank 46 include, but are not limited to, pest control products such as pesticides and insecticides, herbicides, and disinfectants (e.g., hydrogen peroxide, quaternary ammonia, citric acid, etc.). As shown, mister apparatus 10 may include a tank cap 52 constructed to detachably connect to tank inlet 48. A portion of the tank 46 may extend through the aperture 24. In some embodiments, mister apparatus 10 may include one or more tanks such as, for example, tank 46. In an embodiment with more than one tank, the tanks may contain the same or different liquids. Where the tanks contain different liquids, the liquids may be combined before entering the pump, which is discussed below.

As shown, in some embodiments, mister apparatus 10 may include a pump 54, a first liquid pathway 56, a second liquid pathway 58, and a liquid outlet 60. The pump 54, first liquid pathway 56 and/or second liquid pathway 58 may be disposed outside of, partially within, or completely within mister body 12. Pump 54 may include a pump inlet 62 and a pump outlet 64 to permit the pump 54 to draw liquid into and out of the pump 54. Pump 54 may be any type of pump. In some embodiments, pump 54 is a positive displacement pump. In such illustrative embodiments, first liquid pathway 56 connects pump inlet 62 to tank outlet 50. Further, in an embodiment, the liquid in the tank 46 is not pressurized liquid (e.g., if pump 54 is a positive displacement pump). Second liquid pathway 58 may connect pump outlet 64 to liquid outlet 60. Liquid outlet 60 may comprise one or more nozzles, such as liquid nozzle 66. In the illustrated embodiment, liquid outlet 60 may be disposed perpendicular or substantially perpendicular to the air nozzle 42, second air pathway 40, and/or the air flow exiting such air nozzle and/or second air pathway 40. In this configuration, liquid outlet 60 causes the liquid exiting liquid outlet 60 to enter the airflow exiting air nozzle 42 in a perpendicular or substantially perpendicular direction. In other words, in such an embodiment, the longitudinal axis of the liquid stream exiting liquid outlet 60 is not parallel to the longitudinal axis of the air stream exiting air nozzle 42. In various other embodiments, the liquid outlet 60 is not disposed perpendicular or substantially perpendicular to the air nozzle 42, second air pathway 40, and/or the air flow exiting such air nozzle and/or second air pathway 40. For example, the liquid outlet 60 may be disposed at an acute or oblique angle relative to the air nozzle 42, second air pathway 40, and/or the air flow exiting such air nozzle and/or second air pathway 40. The liquid outlet 60 may direct the liquid exiting liquid outlet 60 towards or away from the air nozzle 42, second air pathway 40, and/or the air flow exiting such air nozzle and/or second air pathway 40. Further, the liquid outlet 60 may be disposed parallel to or substantially parallel to the air nozzle 42, second air pathway 40, and/or the air flow exiting such air nozzle and/or second air pathway 40.

Mister apparatus 10 may be connectable to an power source such an A/C power source through a hard-wired connection such as, for example, an A/C chord connectable to an A/C power outlet, to provide power to the mister apparatus. In some embodiments, mister apparatus 10 may be connectable to a DC power source such as, for example, one or more batteries 30. The DC power source may be positioned separate from the mister apparatus 10 and connected to mister apparatus 10 using a hard-wired connection such that mister apparatus 10 may be moved, but the DC power source is kept static. In some embodiments, the DC power source may be permanently or detachably connected to mister apparatus 10. For example, one or more batteries 30 may be disposed outside of, partially within, or completely within mister body 12. In some of those embodiments, one or more batteries 30 may be positioned within and connected to mister body 12. In some embodiments, one or more batteries 30 are rechargeable batteries; in other embodiments, one or more batteries 30 are disposable. In some embodiments, the power source such as, for example, one or more batteries 30, are connected to pump 54 such that the power source provides power to pump 54 to drive or operate pump 54.

Figure 5:
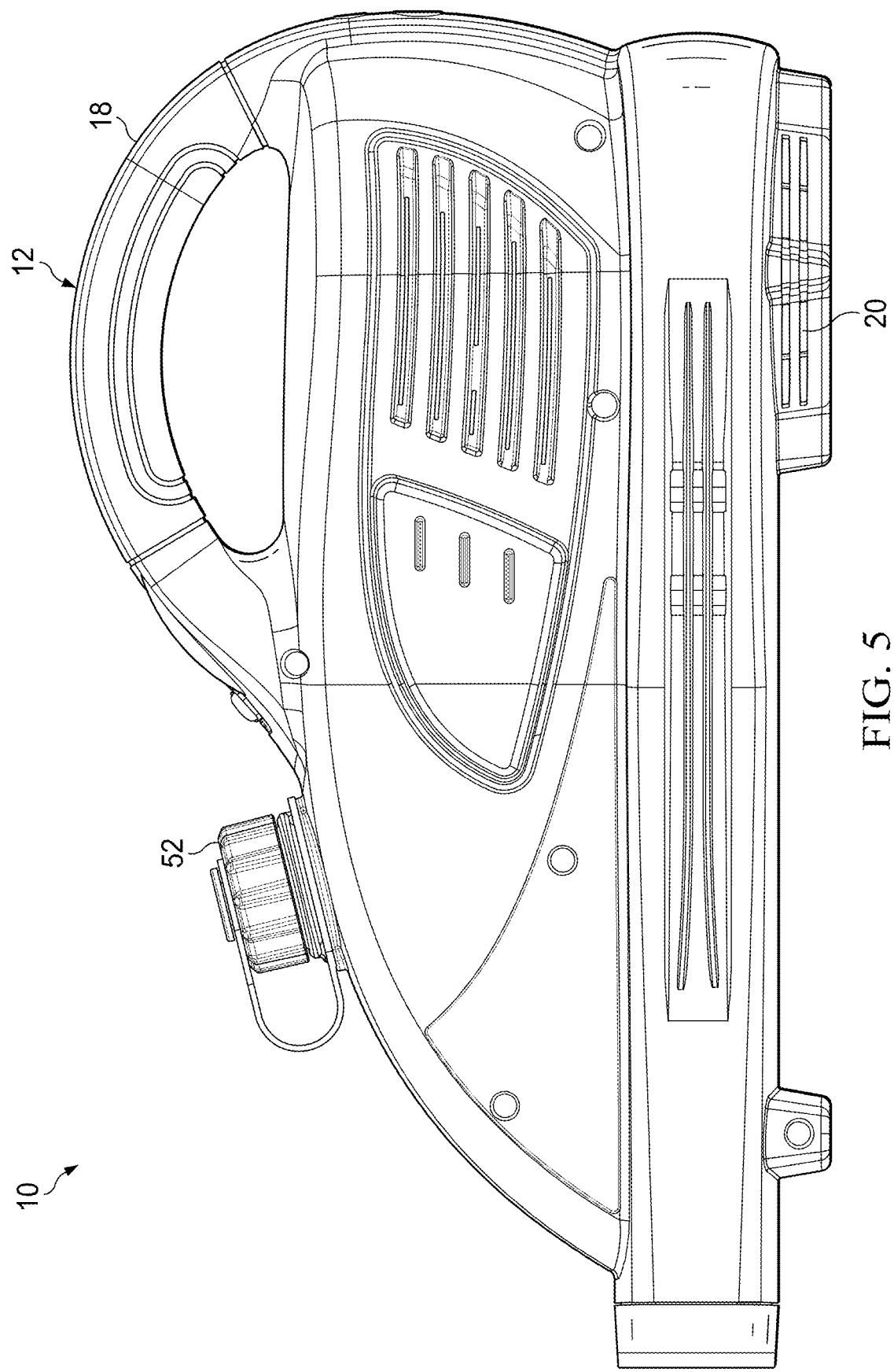
FIG. 5 is a side elevation view of the mister apparatus of FIG. 1.
Figure 6:
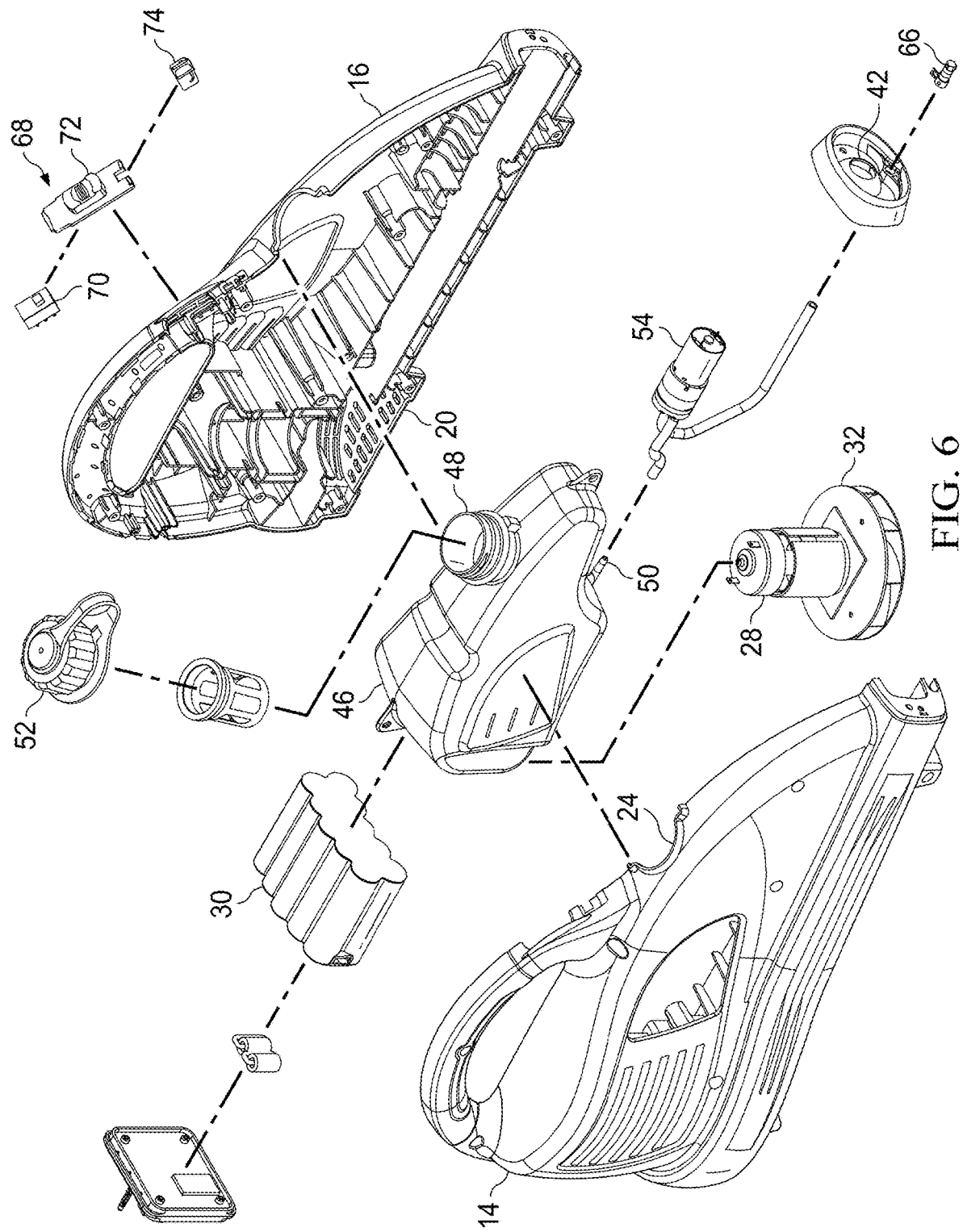
FIG. 6 is a cross-sectional view of the mister apparatus taken along lines B-B of FIG. 1.
Figure 7:
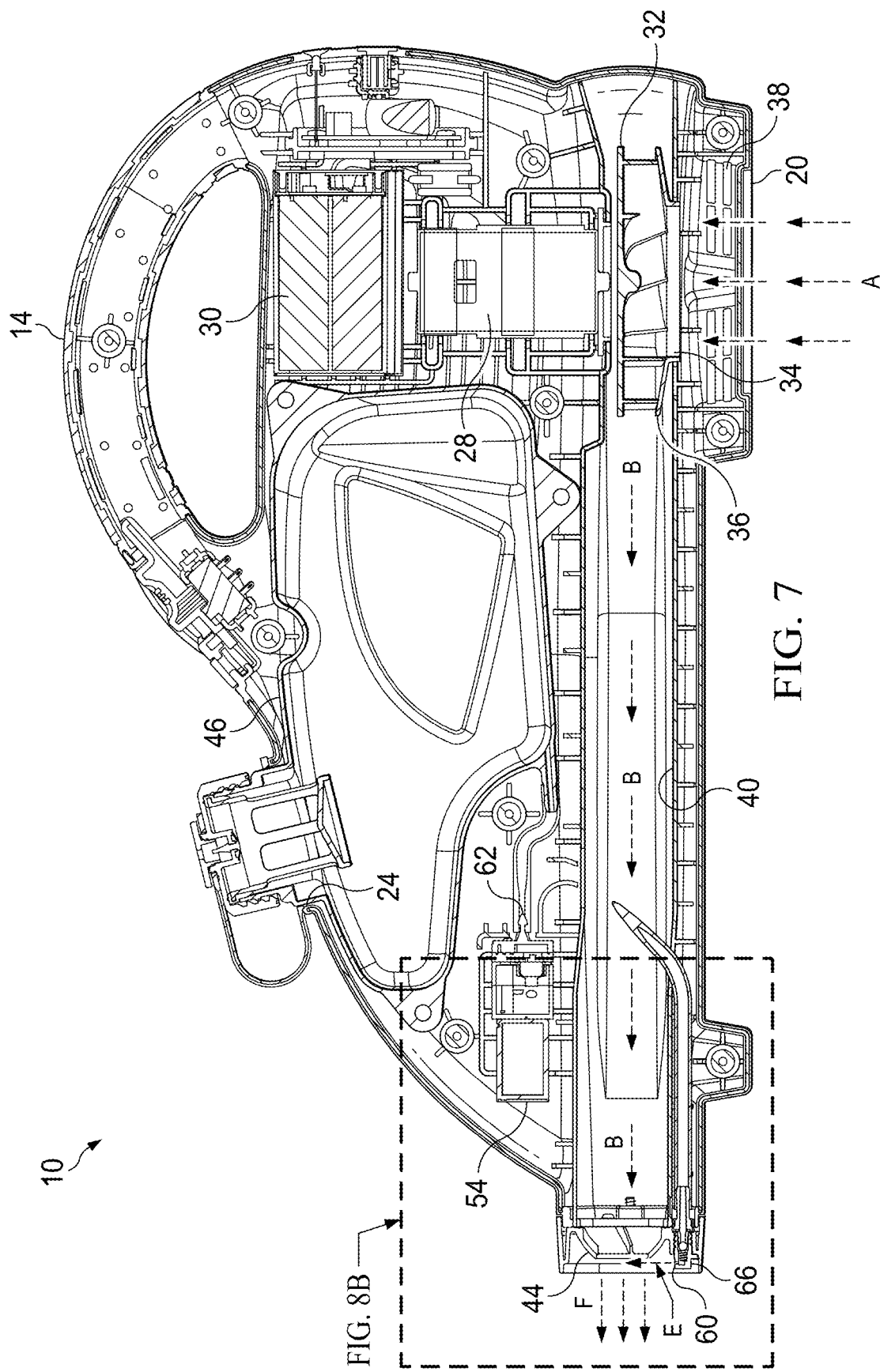
FIG. 7 is a cross-sectional view of the mister apparatus of FIG. 1.
Figure 8A:
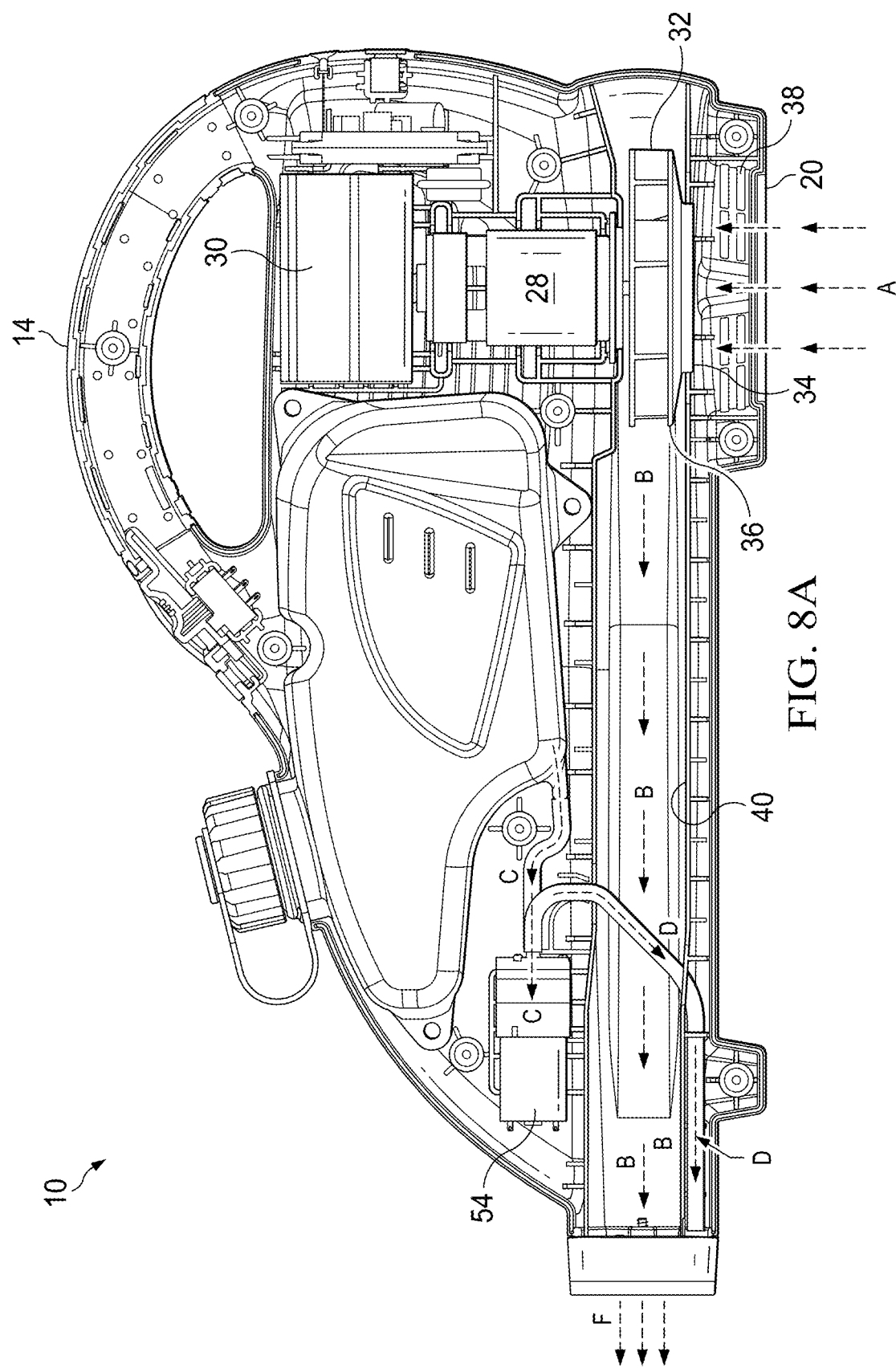
FIG. 8A is an elevation view of the mister apparatus of FIG. 1 with a portion of the housing removed.
Figure 8B:
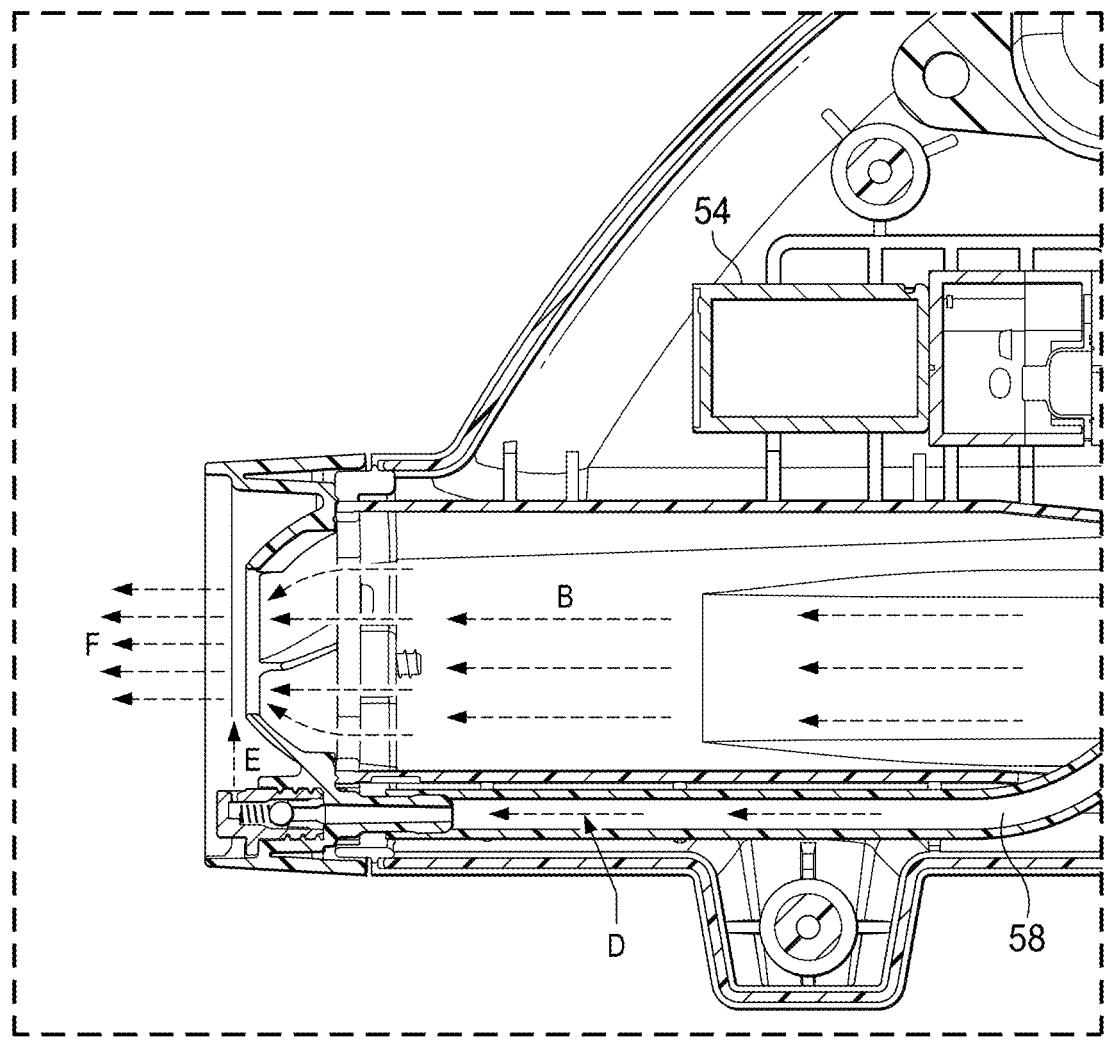
FIG. 8B is an enlarged view of the mister apparatus of FIG. 7.
Figure 8C:
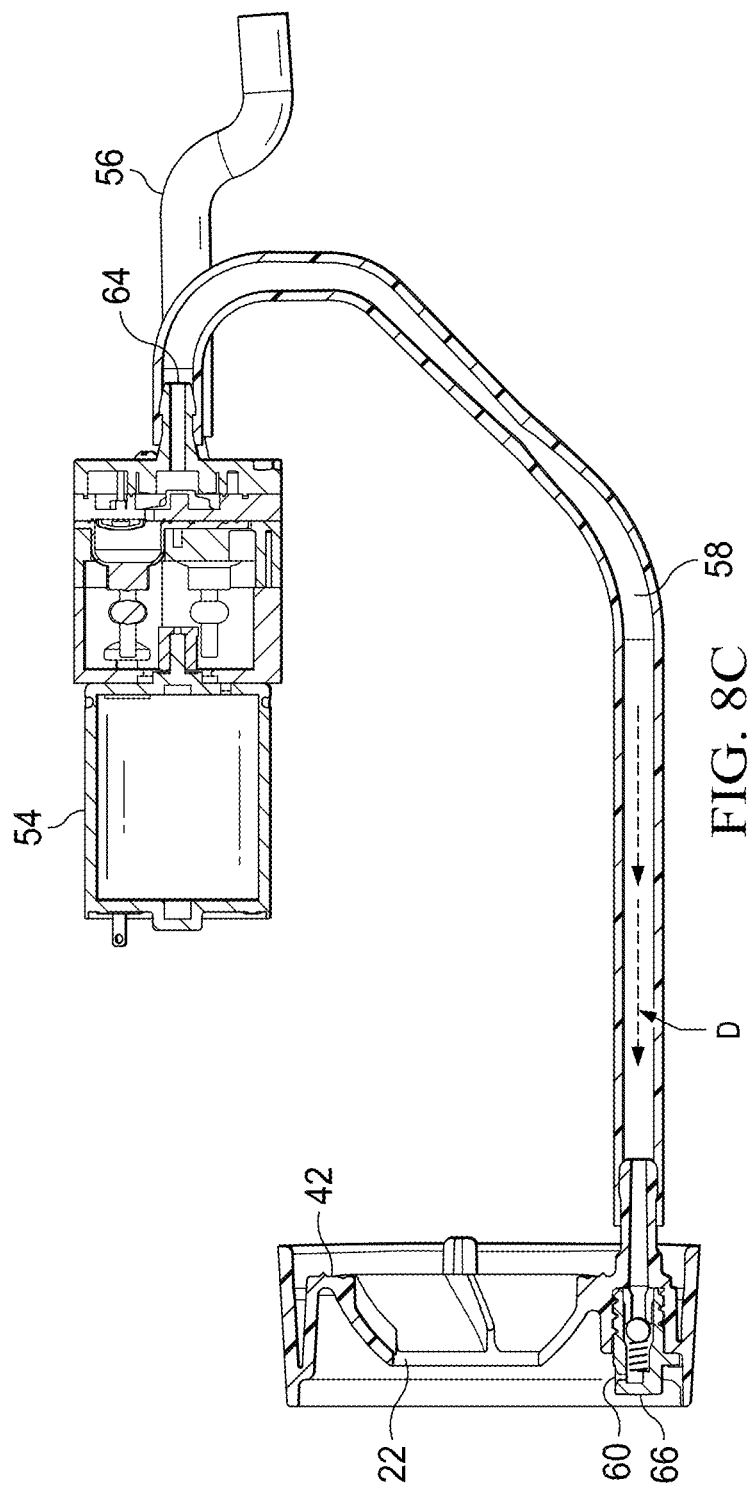
FIG. 8C is a cross-sectional view of the pump, liquid outlet, and air nozzle of the mister apparatus of FIG. 1.
Figure 10:
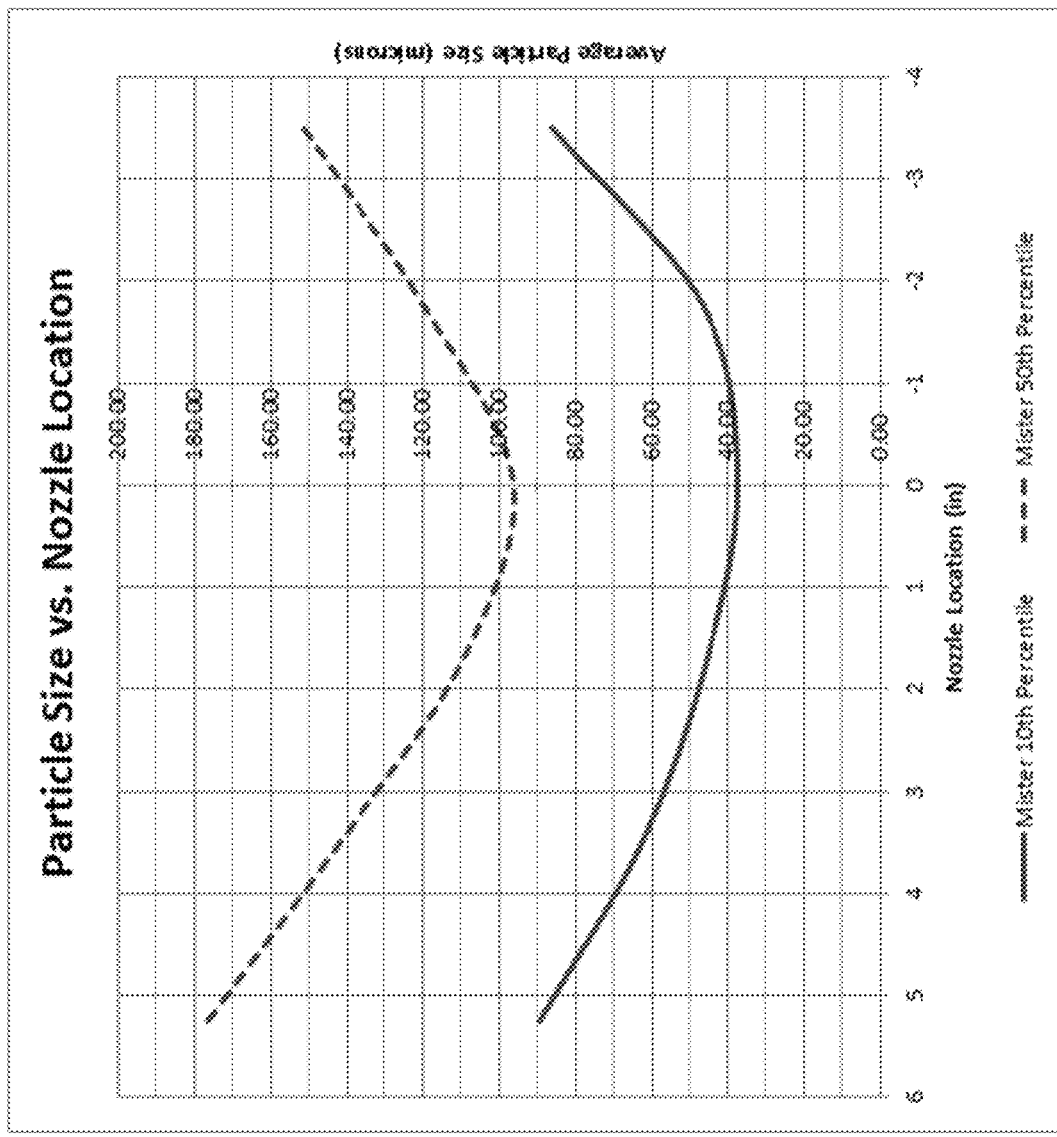
FIG. 10 is a chart showing the average particle size of a mist produced by a mister apparatus according to one or more embodiments relative to the nozzle location.
Figure 11:
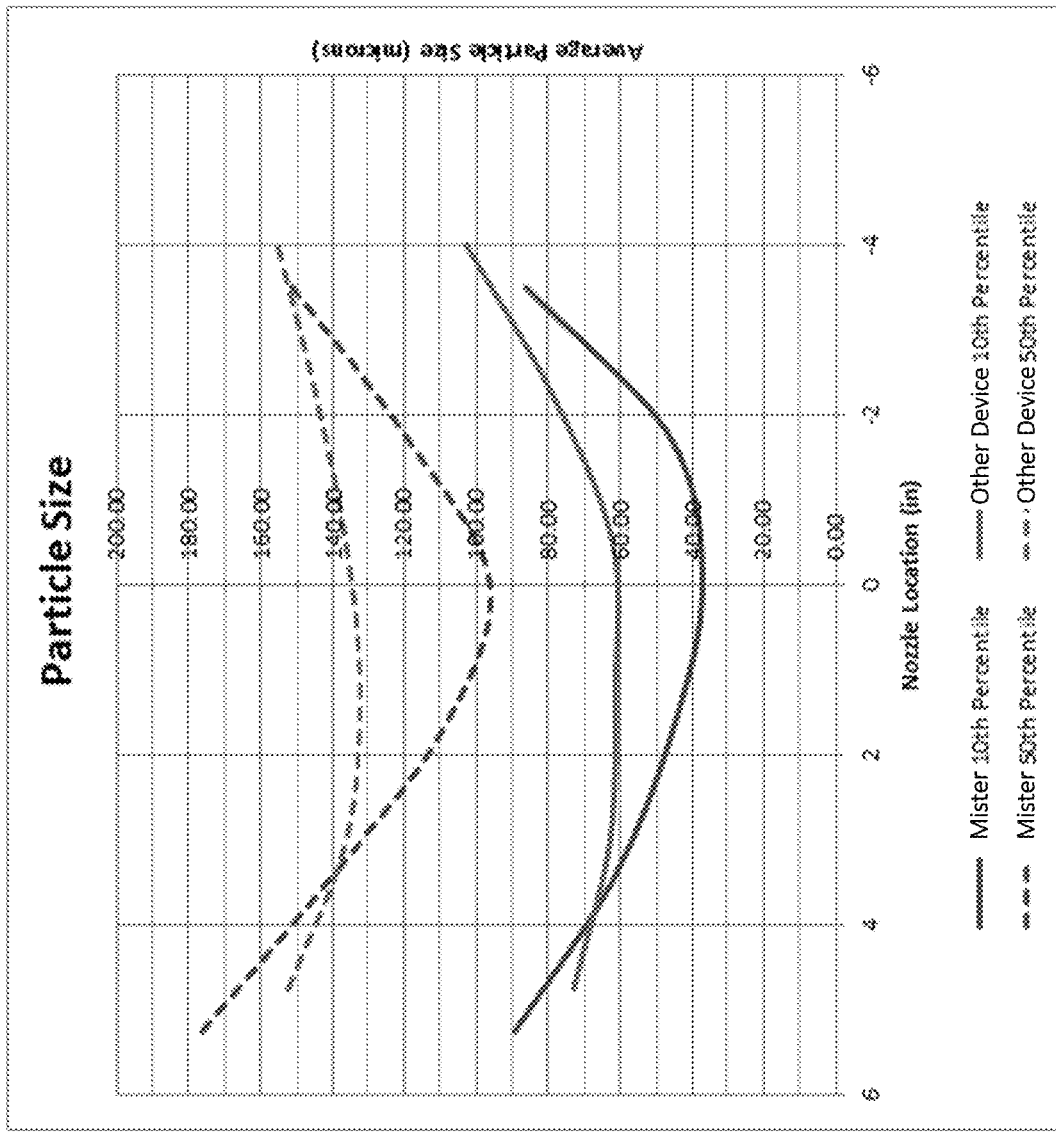
FIG. 11 is a chart comparing the distribution of the average particle size of FIG. 10 to the distribution of the average particle size of a mist produced by a conventional device.

Mister apparatus 10 may include a switch 68 disposed outside of or partially within mister body 12. As shown, switch 68 may be positioned along handle 18. In some embodiments, switch 68 is a two-position, linear switch. Switch 68 may be electrically connected to the power source such as, for example, one or more batteries 30. In some embodiments, switch 68 may include a printed circuit board 70, a switch cover 72, and/or a switch lock 74 as shown in FIG. 5.

In some embodiments, mister apparatus 10 may operate as described below in reference to FIGS. 1-5. An operator may activate switch 68 and, as such, activate mister apparatus 10 by causing battery 30 to provide power to one or more of motor 28 and pump 54. When the switch 68 is activated, the motor 28 begins spinning to build up air speed. After a period of time, for example 3 to 5 seconds, the pump 54 activates and pumps liquid into the air stream.

Motor 28 causes fan 32 to draw air into inlet 20, through first air pathway 38 (e.g., air flow A), and/or into fan inlet 34. Fan 32 causes the air to exit fan outlet 36 into second air pathway 40 and then pass through second air pathway 40 (e.g., air flow B). Fan 32 further causes air flow B into, through, and out of air nozzle 42.

At or about the same time fan 32 is drawing air into mister apparatus 10, the activation of switch 68 causes battery 30 to provide power to pump 54. In an embodiment, switch 68 may be dedicated to the motor 28 and the mister apparatus may include a second switch for controlling the power provided to pump 54. In this manner, the operator may choose to use the mister apparatus 10 as a blower before activating the pump 54. Pump 54 draws liquid from tank 46 through tank outlet 50 and into first liquid pathway 56. The liquid flows through first liquid pathway 56 and into pump inlet 62 (e.g., liquid flow C). Although not shown, the mister apparatus may include a dial for controlling the amount of liquid being pumped out of the tank 46. Pump 54 causes the liquid to exit pump outlet 64 into second liquid pathway 58 and then pass through second liquid pathway 58 (e.g., liquid flow D). Pump 54 further causes liquid flow D through and out of liquid nozzle 66. This liquid flow exiting nozzle 66 in a direction that is perpendicular or substantially perpendicular to air flow B or a substantial portion of air flow B is shown as a liquid flow E in FIGS. 3 and 4. Liquid flow E enters and/or mixes with air flow B as air flow B exits air nozzle 42 (i.e., downstream of air nozzle 42, the outlet of which corresponds to outlet 22). When liquid flow E mixes with airflow B exiting air nozzle 42, the two flows create a new mixed fluid flow F that comprises liquid and air. Fan 32 causes fluid flow F to exit mister body 12 through and out of outlet 22. In other words, mister apparatus 10 may dispense (i.e., spray) fluid flow F. The outer skirt or shroud extending from the air nozzle 42 does not affect the characteristics of the fluid flow F. In other words, the outer skirt does not affect the formation of the mist or its speed or direction. Rather, it serves to protect the liquid nozzle 66 in case of an accident (e.g., the mister apparatus 10 is dropped). The airflow volume at the outlet of the air nozzle 42 may be in a range of about 230 CFM to about 240 CFM, or about 235 CFM. The airflow velocity at the outlet of the air nozzle 42 may be in a range of about 215 mph to about 225 mph, or about 218 mph. When the mister apparatus 10 includes a DC motor 28, the power consumed may be in a range of about 160 W to about 190 W, or about 162 W to about 189 W.

Due to the configuration in some of the embodiments described and shown herein, the mister apparatus (e.g., mister apparatus 10) may dispense fluid flow F at a variety of angles relative to the ground (i.e., at angles other than horizontal or parallel to earth ground level) without dispensing and/or performance gain or loss. For example, mister apparatus 10 may dispense fluid flow F at plus or minus 30 degrees up to plus or minus 90 degrees above or below horizontal relative to earth ground level (e.g., plus or minus 30 degrees above or below an imaginary plane parallel to earth ground level) with minimal and/or no gain or loss in the flow rate of fluid flow F being dispensed from mister apparatus 10. This relatively constant flow of the mist (e.g., fluid flow F) may be provided by the constant pressure and flow provided by the pump 54 and fan 32. The pressure and speed of the pump 54 and fan 32 are not affected by the tilt of the mister apparatus 10.

Additionally, due to the configuration in some of the embodiments described and shown herein, the mister apparatus (e.g., mister apparatus 10) may dispense fluid flow F wherein fluid flow F may have certain fluid and/or fluid flow characteristics. For example, fluid flow F may have a particle size distribution as shown by three representative labeled: AC +3.5 in, AC Center Spray, and AC −3.5 in of Table 1 below (all also represented in the color red). AC Center Spray curve represents the particle size measured at a center of fluid flow F at a linear distance of 24 inches from outlet 22 (i.e., center line extending from outlet 22 to a point 24 inches from outlet 22) versus cumulative distribution. AC +3.5 in curve represents the particle size measured at 3.5 inches above the center of fluid flow F at the linear distance of 24 inches from outlet 22 versus cumulative distribution. AC −3.5 in curve represents the particle size measured at 3.5 inches below the center of fluid flow F at the linear distance of 24 inches from outlet 22 versus cumulative distribution.

For comparison purposes only, and not limitation, a particle size distribution versus cumulative distribution for a conventional mister apparatus was measured for its spray at a linear distance of 24 inches from this mister apparatus' outlet. This mister apparatus spray's particle size distribution versus cumulative distribution is shown by three representative labeled: BF +3.5 in, BF Center Spray, and BF −3.5 in of Table 1 below (all also represented in the color green). BF Center Spray curve represents the particle size measured at a center of the spray at a linear distance of 24 inches from the outlet (i.e., center line extending from the outlet to a point 24 inches from the outlet) versus cumulative distribution. BF +3.5 in curve represents the particle size measured at 3.5 inches above the center of the spray at the linear distance of 24 inches from the outlet versus cumulative distribution. BF −3.5 in curve represents the particle size measured at 3.5 inches below the center of the spray at the linear distance of 24 inches from the outlet versus cumulative distribution.

The particle size distribution versus cumulative distribution as shown in FIG. 9 may be measured using a particle size analyzer (HELOS/KF). The vertical axis represents the cumulative distribution as a percentage of total particles. For example, by looking at the solid red line on the chart, it crosses the 60% mark at around 100 μm. This means that 60% of the particles are smaller than 100 μm, while 40% of particles are larger than 100 μm. Around 300 μm, the red line reaches 100%, which means that all of the particles are less than or equal to 300 μm.

With respect to FIGS. 10 and 11, a mister apparatus according to one or more embodiments may produce a mist in which the smallest particle sizes congregating towards the very center of the spray. As shown in FIG. 10, particle sizes (shown are 10th and 50th percentile sizes) are significantly smaller towards the center of the spray compared to the outer portions of the spray. FIG. 11 shows the particle size distribution produced by a mister apparatus as described herein compared to a conventional device. Overall, the mister apparatus according to one or more embodiments created an overall smaller particle, while also creating a more distinct minimum, located at the center of the spray.

The foregoing description of embodiments and examples has been presented for purposes of illustration and description. It is not intended to be exhaustive or limiting to the forms described. Numerous modifications are possible in light of the above teachings. Some of those modifications have been discussed, and others will be understood by those skilled in the art. The embodiments were chosen and described in order to best illustrate principles of various embodiments as are suited to particular uses contemplated. The scope is, of course, not limited to the examples set forth herein, but can be employed in any number of applications and equivalent devices by those of ordinary skill in the art. Rather it is hereby intended the scope of the invention to be defined by the claims appended hereto.

What is claimed is:

1. A mister apparatus comprising:

a. a portable mister body having an air inlet and an air outlet;

b. a fan configured to draw air in through the air inlet and force the air out the air outlet;

c. a reservoir configured to contain a liquid, the reservoir having a reservoir outlet;

d. a liquid outlet, the liquid outlet being disposed downstream of the air outlet; and e. a pump in fluid communication with the reservoir, the pump being operable to move the liquid from the reservoir and out of the liquid outlet such that the liquid exiting the liquid outlet enters into the air exiting the air outlet to form a mist;

wherein the liquid outlet is substantially perpendicular to the air outlet, the liquid outlet constructed to dispense the liquid at an orientation substantially perpendicular to the air exiting the air outlet.

2. The mister apparatus of claim 1, wherein a first flow rate of the mist when a longitudinal axis of the air outlet is parallel to a ground is substantially the same as a second flow rate when the longitudinal axis of the air outlet is at an upward angle of up to about 90 degrees relative to the ground.

3. The mister apparatus of claim 2, wherein the first flow rate of the mist when the longitudinal axis of the air outlet is parallel to the ground is substantially the same as a third flow rate when the longitudinal axis of the air outlet is at a downward angle of up to about 90 degrees relative to the ground.

4. The mister apparatus of claim 1, wherein the liquid outlet is not coaxial relative to the air outlet.

5. The mister apparatus of claim 1, wherein the pump is a positive displacement pump.

6. The mister apparatus of claim 1, further comprising a motor operably coupled to the fan.

7. The mister apparatus of claim 6, further comprising a battery coupled to the pump and the motor.

8. The mister apparatus of claim 1, further comprising a switch operably configured to control the fan.

9. The mister apparatus of claim 8, wherein the switch is operably configured to control the pump.

10. The mister apparatus of claim 1, further comprising the liquid, wherein the liquid in the reservoir is not pressurized.

11. The mister apparatus of claim 1, further comprising an air pathway extending between an outlet of the fan and the air outlet.

12. The mister apparatus of claim 1, further comprising a first liquid pathway in fluid communication with the reservoir and the pump.

13. The mister apparatus of claim 12, further comprising a second liquid pathway in fluid communication with the pump and the liquid outlet.

14. The mister apparatus of claim 1, wherein the mist comprises particles and 40% or more of the particles are larger than 100 μm.

15. The mister apparatus of claim 1, wherein the mister apparatus is configured to produce a spray having a particle size distribution where smaller particles congregate towards a center of the spray and larger particles congregate towards an outer edge of the spray.

16. The mister apparatus of claim 1, further comprising the liquid, wherein the liquid is a disinfectant.

17. A mister apparatus comprising:

a. a portable mister body having an air inlet and an air outlet;

b. a fan configured to draw air in through the air inlet and force the air out the air outlet;

c. a motor operably coupled to the fan;

d. a reservoir configured to contain a liquid, the reservoir having a reservoir outlet;

e. a liquid outlet, the liquid outlet being disposed downstream of the air outlet; and f. a positive displacement pump in fluid communication with the reservoir, the positive displacement pump being operable to move the liquid from the reservoir and out of the liquid outlet such that the liquid exiting the liquid outlet enters into the air exiting the air outlet to form a mist, wherein the liquid outlet is substantially perpendicular to the air outlet, the liquid outlet constructed to dispense the liquid at an orientation substantially perpendicular to the air exiting the air outlet; and wherein the mist comprises particles and 40% or more of the particles are larger than 100 µm.

18. The mister apparatus of claim 17, further comprising the liquid, wherein the liquid in the reservoir is not pressurized.

19. The mister apparatus of claim 17, wherein the mister apparatus is configured to produce a spray having a particle size distribution where smaller particles congregate towards a center of the spray and larger particles congregate towards an outer edge of the spray.

20. The mister apparatus of claim 17, further comprising the liquid, wherein the liquid is a disinfectant.

* * * * *